(12) United States Patent
Heinrich et al.

(10) Patent No.: US 10,139,615 B2
(45) Date of Patent: Nov. 27, 2018

(54) LONG-RANGE OPTICAL DEVICE WITH A HOUSING AND A SUPPORT MEANS

(71) Applicant: Swarovski-Optik KG., Absam (AT)

(72) Inventors: Christoph Heinrich, Aldrans (AT); Christoph Frech, Thaur (AT); Rene Zangerl, Hall (AT)

(73) Assignee: Swarovski-Optik KG. (AT)

( * ) Notice: Subject to any disclaimer, the term of this patent is extended or adjusted under 35 U.S.C. 154(b) by 226 days.

(21) Appl. No.: 15/159,007

(22) Filed: May 19, 2016

(65) Prior Publication Data

US 2016/0341949 A1 Nov. 24, 2016

(30) Foreign Application Priority Data

May 19, 2015 (AT) .......................... GM 50090/2015
May 19, 2015 (DE) .................... 20 2015 003 640 U

(51) Int. Cl.
*G02B 23/00* (2006.01)
*G02B 23/18* (2006.01)
(Continued)

(52) U.S. Cl.
CPC ............... *G02B 23/18* (2013.01); *G01C 3/04* (2013.01); *G01C 3/08* (2013.01); *G02B 23/16* (2013.01); *H01R 13/625* (2013.01); *H01R 24/38* (2013.01); *H01R 35/04* (2013.01); *H01R 39/64* (2013.01); *H01R 2105/00* (2013.01)

(58) Field of Classification Search
CPC ........ G02B 23/00; G02B 23/02; G02B 23/04; G02B 23/06; G02B 23/08; G02B 23/10; G02B 23/105; G02B 23/14; G02B 23/145; G02B 23/16; G02B 23/18; F41G 1/00; F41G 1/02; F41G 1/027; F41G 1/033; F41G 1/04; F41G 1/06; F41G 1/065; F41G 1/08; F41G 1/10; F41G 1/12; F41G 1/14; F41G 1/16; F41G 1/17; F41G 1/18; F41G 1/20; F41G 1/22; F41G 1/24; F41G 1/26;
(Continued)

(56) References Cited

U.S. PATENT DOCUMENTS 4,026,618 A 5/1977 Straka
4,153,362 A 5/1979 Dietz et al.
(Continued)

FOREIGN PATENT DOCUMENTS

CA 2762400 A1 6/2013
DE 102010003878 A1 10/2011
(Continued)

OTHER PUBLICATIONS

European Search Report for EP Application No. 16170444, dated Sep. 16, 2016.
(Continued)

*Primary Examiner* — Arnel C Lavarias
(74) *Attorney, Agent, or Firm* — Lerner, David, Littenberg, Krumholz & Mentlik, LLP

(57) ABSTRACT

A binoculars, with a housing (2) and a support means, wherein at least one mount (3) is provided between the housing (2) and the support means for forming a mechanical connection, and wherein the at least one mount (3) includes an interface for forming an electrical or electronic connection between the housing (2) and the support means.

27 Claims, 8 Drawing Sheets

(51) Int. Cl.
*G02B 23/16* (2006.01)
*H01R 13/625* (2006.01)
*H01R 24/38* (2011.01)
*G01C 3/04* (2006.01)
*G01C 3/08* (2006.01)
*H01R 105/00* (2006.01)
*H01R 35/04* (2006.01)
*H01R 39/64* (2006.01)

(58) Field of Classification Search
CPC ... F41G 1/28; F41G 1/38; F41G 1/383; F41G 1/387; F41G 1/40; F41G 1/41
USPC ...... 359/362, 363, 399, 400, 401, 402, 403, 359/404, 405, 406, 407, 408, 409, 410, 359/411, 412, 413, 414, 415, 416, 417, 359/418, 419; 42/111, 118, 119, 120, 42/122, 123, 124, 125, 126, 127, 128, 42/129, 130, 131, 132, 135, 148
See application file for complete search history.

(56) References Cited

U.S. PATENT DOCUMENTS

| | | | |
|---|---|---|---|
| 5,036,343 A * | 7/1991 | Yamanaka | G03B 17/563 348/373 |
| 7,869,004 B2 | 1/2011 | Gerth et al. | |
| 8,047,729 B2 | 11/2011 | Kope et al. | |
| 9,383,167 B1 * | 7/2016 | Connolly | F41G 11/003 |
| 2004/0046953 A1 | 3/2004 | Nagata et al. | |
| 2007/0060210 A1 * | 3/2007 | Chen | H02J 7/0044 455/572 |
| 2008/0007826 A1 * | 1/2008 | Smith | G02B 23/12 359/407 |
| 2012/0070119 A1 * | 3/2012 | Hagen | G02B 23/12 385/53 |
| 2012/0105982 A1 * | 5/2012 | Sullivan | A61B 1/00114 359/811 |
| 2013/0097829 A1 | 4/2013 | Moreno-Stolz | |
| 2013/0192073 A1 | 8/2013 | Gleim | |
| 2013/0253820 A1 | 9/2013 | Denk | |
| 2014/0116085 A1 * | 5/2014 | Lam | H04W 84/18 63/1.11 |
| 2014/0226962 A1 | 8/2014 | Henry | |
| 2014/0373423 A1 * | 12/2014 | Teetzel | A42B 3/04 42/118 |

FOREIGN PATENT DOCUMENTS

| | | |
|---|---|---|
| EP | 2124476 A2 | 11/2009 |
| EP | 2241935 A1 | 10/2010 |
| JP | H09127431 A | 5/1997 |
| WO | 9702630 A1 | 1/1997 |
| WO | 0106298 A1 | 1/2001 |
| WO | 2008131135 A1 | 10/2008 |
| WO | 2014155431 A1 | 10/2014 |

OTHER PUBLICATIONS

European Search Report for EP Application No. 16170444, dated Jan. 20, 2017.

* cited by examiner

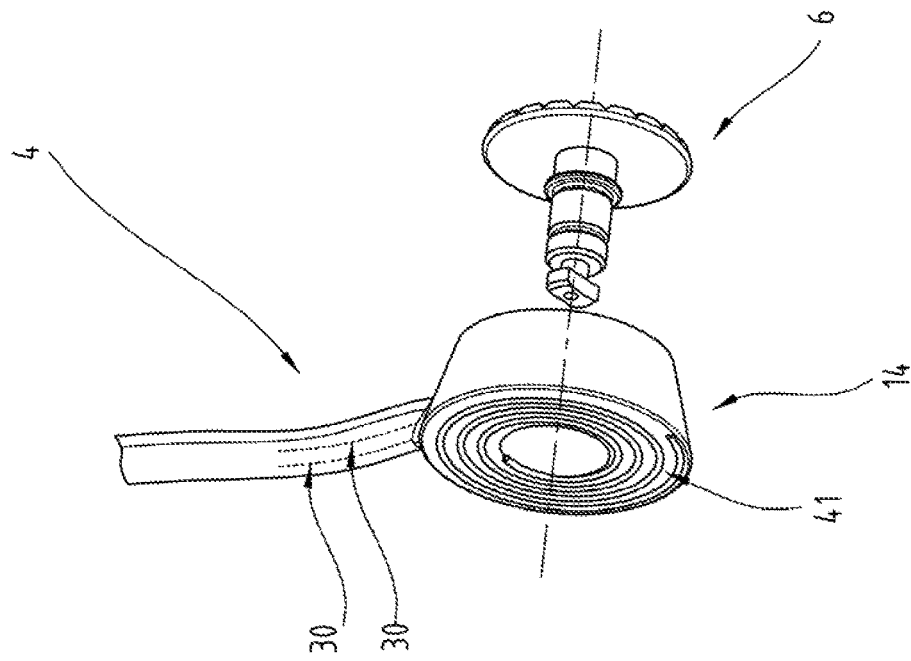
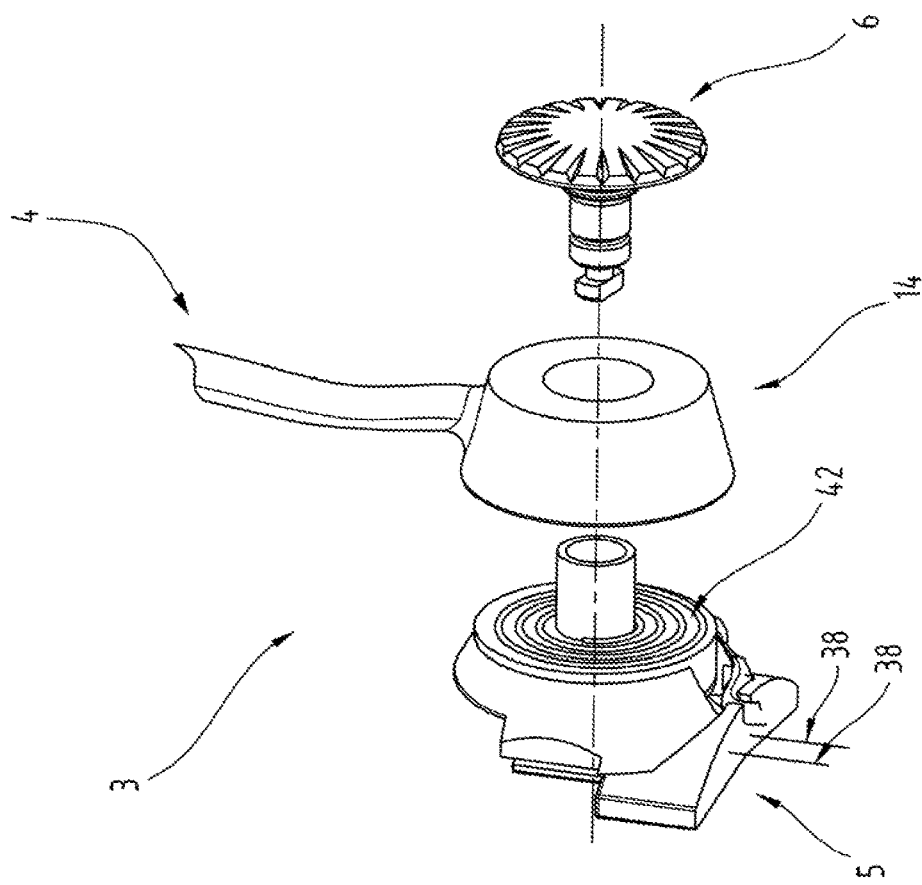

LONG-RANGE OPTICAL DEVICE WITH A HOUSING AND A SUPPORT MEANS

The invention relates to a long-range optical device, in particular binoculars, with a housing and at least one mount for a support means.

Usually straps for holding a long-range optical device, for example binoculars, are fastened into eyelets, which are fixed to a housing of the long-range optical device and are used for attaching a flat shoulder strap. The disadvantage of the known solution is mainly that the strap may get twisted when the binoculars are used.

Nowadays long-range optical devices, such as binoculars, are increasingly provided with additional electronic functions. Such additional electronically control functions include for example a laser range finder, a camera or—particularly in the hunting world—the integration of a ballistics calculator. Of course, electronic components of this kind require a suitable power supply for said additional devices themselves, but also for additional components, for example for data transmission to external devices. Despite the integration of additional electronically controlled functions it is desirable to keep the weight of the hand-held binoculars as low as possible and to keep its structural size compact. There is also an increased demand for devices to which additional functions can be added later as desired.

The objective of the invention is to provide a system consisting of a long-range optical device with electronically controlled functions and a support means, which is user-friendly and in particular provides a user-friendly weight distribution of its components.

Said objective is achieved by a long-range optical device, in particular binoculars, with a housing and with a support means, wherein between the housing and the support means at least one mount is provided for forming a mechanical connection and wherein the at least one mount comprises an interface for forming an electrical or electronic connection between the housing and the support means. This has the advantage that in this way the mechanical and also the electrical connection can be made or released comfortably by means of a single manipulation.

It is also an advantage if electric or electronic components are arranged in the housing and in the support means respectively, as in this way it is possible to achieve a favorable weight distribution.

Advantageously, the interface to the electrical or electronic connection is formed by contact points and in the connected state by contact pins that are in electrical connection therewith.

According to a preferred embodiment the interfaces to the electrical or electronic connection are formed by contact points, which are arranged on opposite sides, in particular on opposite, circular ring disc-shaped sides, of the mount housing and the first part of the housing.

The development is also advantageous in which the contact points are formed by contact openings, in particular circular arc-shaped contact openings, and contact pins projecting into the contact openings.

Alternatively or in addition it is possible that the interfaces to the electrical or electronic connection are formed by slip rings on an outer casing surface of the socket and by electricity consumers in a passage opening of the mount housing.

According to one advantageous embodiment variant the interfaces to the electrical or electronic connection are formed by induction loops, which are arranged on opposite, circular ring disc-shaped sides of the mount housing and the first part of the housing.

In a further alternative embodiment the interfaces to the electrical or electronic connection are formed by coils, which are arranged on an outer casing surface of the socket and in a passage opening of the mount housing and coaxially to one another.

It is also advantageous if a power supply unit is arranged in the support means.

Lastly, it is an advantage, if an electronic component is arranged in the support means, which is selected from a group comprising a control, an input, a display, a GPS receiver, a temperature sensor, an air pressure sensor, a microphone, a loudspeaker, a data memory, an acceleration sensor, a compass, a vibration motor, solar cells, an antenna and a terminal for wired electrical connection.

According to a preferred embodiment a laser range finder or a camera is arranged in the housing.

It is an advantage in particular if the strap is connected to a rotatably mounted mount housing and is secured rotatably by the latter to the housing. By means of the rotatable connection of the strap to the housing it is possible to prevent the strap from twisting in a very efficient manner. Particularly preferably, the mount housing is mounted freely rotatably on the housing of the long-range optical device.

According to an advantageous development of the invention the mount housing is mounted rotatably about an axis normal to a surface of the housing.

In a preferred variant of the invention it is possible that the mount housing is mounted rotatably about a socket.

It is possible to achieve a simple securing and release of the strap in that the at least one mount comprises at least one first part fixed onto the housing and at least one second part connected releasably to the at least one first part, wherein the at least one first part and the at least one second part form a bayonet closure. This variant of the invention makes it possible to replace the strap rapidly and easily. The strap can also be removed from the housing in a simple manner when not required.

It is particularly advantageous if the socket is arranged on the at least one first part fixed onto the housing.

The use of the mount can be made easier in that the at least one second part comprises a shaft and a head projecting over the shaft in radial direction.

According to an advantageous variant of the invention it is possible that the at least one second part has at least one holding nose arranged on the shaft and protruding from the latter in radial direction.

According to one embodiment which ensures a particularly reliable mounting of the second part in the first part of the mount, the at least one second part comprises at least two opposite holding noses.

A simple structure of the second part, which is advantageous in terms of manufacturing technology, can be achieved in that the at least two holding noses are designed in one piece with one another and are formed by a beam-like element arranged on an end side of the shaft.

It is possible to secure the second part effectively to prevent sliding in a direction parallel to a longitudinal central line of the shaft, in that the shaft has a smaller diameter in a section immediately in front of the at least one holding nose than in a section directly adjoining said section, as viewed in the direction of the head.

Furthermore, the shaft can have a flange projecting in radial direction in an area between the at least one holding nose and the head, which flange forms in particular a collar running in the circumferential direction of the shaft.

It is particularly advantageous if the mount comprises at least one mount housing fixed onto the at least one second part.

The effective fixing of the mount housing to the second part can be achieved in that the mount housing has a passage opening for the shaft, wherein in a section of the passage opening at least one web is arranged projecting into the passage opening made from an elastomer material, wherein the diameter of the shaft in the region of the flange is greater than a clear cross-section of the passage opening in the region of the at least one web. In this embodiment the unwanted detachment of the second part from the mount housing can be prevented opposite a closing direction of the mount, as the flange, once it has passed the web of the passage opening, is blocked by the latter opposite the closing direction.

It is particularly advantageous if the mount housing is made from at least two half-shells, wherein the strap is clamped between the two half-shells. In this way the strap can be connected to the housing and released from the latter particularly easily.

Alternatively or in addition to the aforementioned solution at least one eyelet can be arranged on the mount housing. Said eyelet can also be used for securing the strap.

In one variant of the invention, which is characterized by a high degree of reliability and a simple structure, it is possible that the at least one first part of the mount comprises a passage opening in the form of an elongated hole for the at least one holding nose of the at least one second part, wherein a width of the passage opening is smaller than a diameter of a projection of the holding nose and the shaft in a plane normal to a longitudinal central straight line of the shaft. In this variant the distance between the free end sides of the holding noses is greater than the width of the passage opening. In this way it is ensured that on rotating the second part after passing the holding noses of the passage opening the holding noses are moved into a position in which they can no longer pass the passage opening and thus fix the first part in the second part.

In order to prevent the unwanted detachment of the second part from the first part of the mount, it may be possible that the at least one first part in an insertion direction of the shaft, as viewed through the passage opening, has at least one spring arranged after the passage opening, in particular a leaf spring, wherein the at least one holding nose of the at least one second part is clamped in a locked state of the bayonet closure between an area adjoining an edge of the passage opening and the at least one spring. For a better understanding of the invention the latter is explained in more detail with reference to the following figures.

In a much simplified, schematic representation:

FIG. 1 shows a perspective view of a mount according to the invention which is mounted on a housing of a long-range optical device;

FIG. 2 shows a perspective view of a first part of the mount of FIG. 1;

FIG. 3 shows a perspective view of a second part of the mount of FIG. 1;

FIG. 4 shows a partial cross-section along the line IV-IV of FIG. 1;

FIG. 5 shows a perspective view of a housing of the mount from FIG. 1;

FIG. 6 shows a perspective view of the first and second part of the mount from FIG. 1 in an opened state;

FIG. 7 shows a perspective view of a further variant of a mount housing;

FIG. 8 shows a perspective view of a mount according to the invention which is mounted on a housing of a long-range optical device, wherein the mount comprises the mount housing from FIG. 7;

FIG. 9 shows a perspective view of a lower side of the first part of the mount from FIG. 1;

FIG. 10 shows the first part of the mount from FIG. 8 with an inserted spring;

FIG. 11 shows the long-range optical device connected to the strap, shown in perspective view;

FIG. 12 shows a cross-section of one of the two mounts on the long-range optical device, according to FIG. 11;

FIG. 13 shows the mount with an electric interface according to a further example embodiment in an exploded view;

FIG. 14 shows the housing of the mount according to FIG. 13;

FIG. 15 shows the mount with an electrical interface according to a further example embodiment in an exploded view;

FIG. 16 shows the mount housing and the second part of the mount according to FIG. 15;

FIG. 17 shows the mount with a wireless electrical interface according to a further example embodiment in an exploded view;

FIG. 18 shows the mount housing and the second part of the mount according to FIG. 17;

FIG. 19 shows the mount with a wireless electrical interface according to a further example embodiment in an exploded view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

DESCRIPTION OF THE FIGURES

According to FIG. 1 a long-range optical device 1 comprises a housing 2 and at least one mount 3 for a strap 4. In the shown variant the long-range optical device is a pair of binoculars or telescope which can be designed to be binocular or monocular. However, it should be noted at this point that the long-range optical device can also be a camera, a range finder, a telescope or the like.

Usually two mounts 3 are provided so that both free ends of the strap 4 can be fixed onto the housing 2. The mount 3 can have a first part arranged fixed to the housing 2, which first part is denoted in FIG. 2 by the reference numeral 5 and a second part which can be connected releasably to the first part 5, which is denoted in FIG. 1 by the reference numeral 6. The first part 5 and the second part 6 form a bayonet-closure. The mount 3 is arranged in the shown variant in an eyepiece-side end section of the housing 2.

Figure 3:
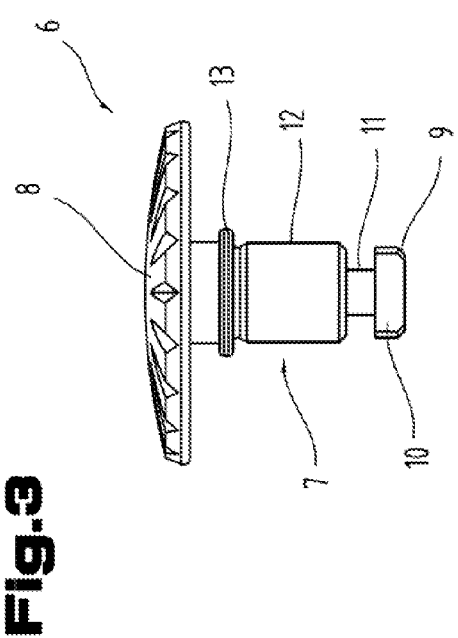
As shown in FIG. 3, the second part 6 can comprise a shaft 7 and a head 8 projecting over the shaft 7 in radial direction.

In addition, the at least one second part 6 according to FIG. 3 can have two opposite holding noses 9, 10 which are designed in one piece with one another and can be formed by a beam-like element arranged on an end side of the shaft 7. It should be noted at this point that it would also be sufficient in principle to provide also only one holding nose 9 or 10 on the shaft 7 projecting from the latter in radial direction.

Figure 6:
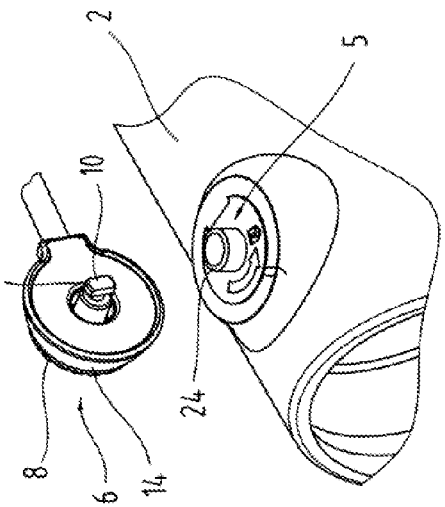

The shaft 7 can also have a smaller diameter in a section 11 immediately in front of the holding nose 9, 10 than in an area 12 immediately adjoining the section 11 in the direction of the head 8. Said embodiment has proved to be very advantageous for connecting the second part 6 to the first part 5. The diameter of the area 12 can be slightly smaller than the diameter of a tubular socket, provided in FIG. 6 with the reference numeral 24, which is arranged on the first part 5.

Figure 5:
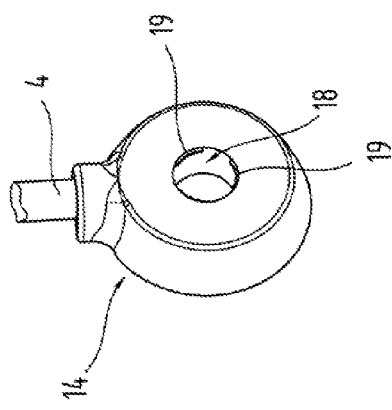

Furthermore, in an area between the area 12 and the head 8 the shaft 7 can have a flange 13 protruding in radial direction. The flange 13 can form a collar running in the circumferential direction of the shaft 7. Together with the webs 19 shown in FIGS. 5 and 7, which project into a passage opening 18 of a mount housing 14 or 20, the shaft 7 can be secured in the mount housing 14 or 20. The webs 19 can be made in this case from an elastomer material. The diameter of the shaft 7 in the region of the flange 13 is greater than a clear cross-section of the passage opening 18 in the region of the at least one web 19. If the flange 13 is moved through the passage opening 18 the webs 19 are bent back. After passing the webs 19 the latter move back into their starting position.

Figure 4:
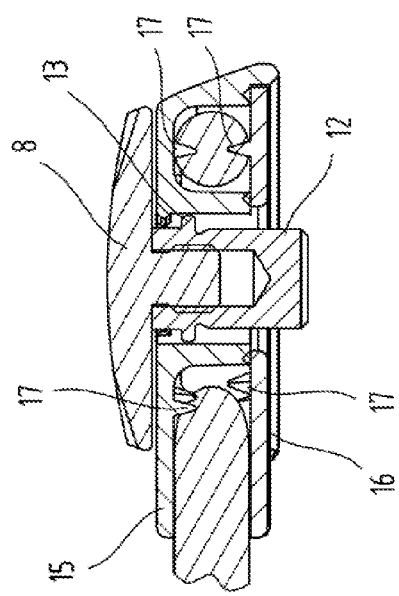
As shown in FIG. 4, the head 8 can be screwed into the shaft 7. Of course, it also possible to connect the head 8, preferably made of plastic, to the shaft 7, preferably made of metal, in a different way, for example by means of adhesion.

In the direction of the holding noses 9, 10 a groove formed for example circumferentially in the shaft 7 can also adjoin the flange 13. As shown in FIG. 4, sections of the mount housing 14 can engage in said groove, in order to improve the fixing of the mount housing 14 on the shaft 7. The sections of the mount housing 14 engaging in the groove can be made like the webs 19 from an elastomer material. The mount housing 14 and the shaft 7 can be joined together securely to form a unit. Naturally the description of FIG. 4 above also applies to the mount housing 20 shown in FIG. 7. The strap 4 is connected by means of the mount housing 14 to the housing 2, wherein the mount housing 14 is mounted rotatably, in particular freely rotatably, on the housing 2. The mount housing 14 can be mounted rotatably about an axis a normal to the surface of the housing 2 of the long-range optical device 1. Particularly preferably, the mount housing 14 is rotatably mounted in the socket 24 shown in FIG. 6.

As shown in FIG. 4 the mount housing 14 can be made from two half-shells 15, 16, wherein the strap 4 is clamped between the two half-shells 15, 16. In order to clamp the strap 4 reliably between the two half-shells 15, 16 projections 17 can be provided on the insides of the half-shells 15, 16. The projections 17 can be tooth-like, for example in form of a truncated pyramid or truncated cone. The two half-shells 15, 16 can be adhered or welded to one another for example. Preferably, the two half-shells 15, 16 are joined together by ultrasound welding.

Figure 7:
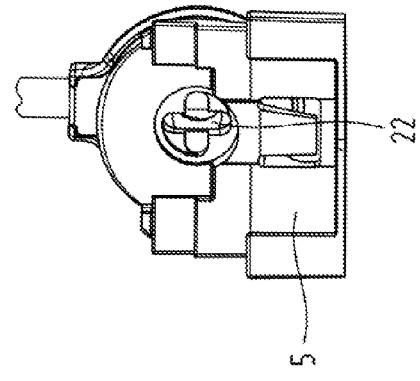
Figure 8:
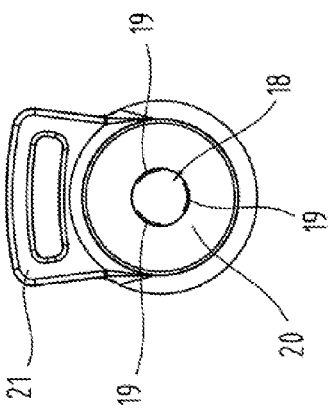

As shown in FIGS. 7 and 8, an eyelet 21 can also be arranged on the mount housing 20 for securing the strap.

Figure 9:
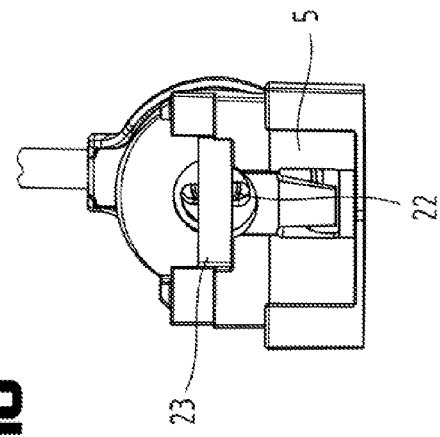

According to FIG. 9 the first part 5 of the mount 3 can have a passage opening 22 in the form of an elongated hole for the at least one holding nose 9, 10 of the second part 6. A width of the passage opening 22 is smaller than a diameter of a projection of the holding noses 9, 10 and the shaft 7 in a plane normal to a longitudinal central straight line of the shaft 7. Thus the distance between the free ends of the holding noses 9, 10 is greater than the width of the passage opening 22. The length of the passage opening 22 is greater however than the distance between the free ends of the holding noses 9, 10 in order to enable the latter to be guided through the passage opening 22. Once the holding noses 9, 10 have passed through the passage opening 22 when joining together the first part 5 and the second part 6, the holding nose 9, 10 or the shaft 7 can be rotated by 90° and thus the first part 5 and the second part 6 can be connected to one another. In the connected state the holding noses 9, 10 bear on an area adjoining an edge of the passage opening 22.

To detach the parts 5 and 6 from one another the holding noses 9, 10 are moved by rotating the shaft 7 by 90° out of engagement with the edges of the passage opening 22 and can be guided in this position through the passage opening 22.

Figure 10:
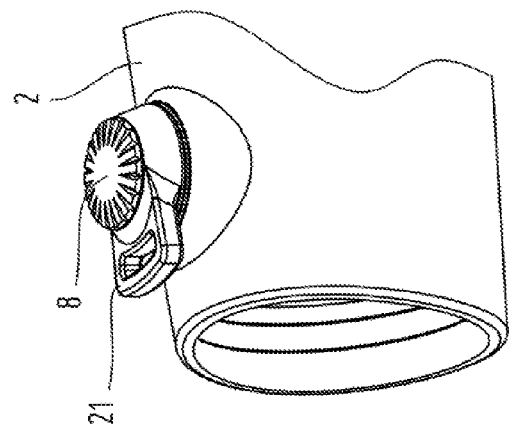

According to FIG. 10 the first part 5 in an insertion direction of the shaft 7 as viewed through the passage opening 22 can have a spring 23 arranged downstream of the passage opening 22. The spring 23 can be a leaf spring for example. The holding noses 9, 10 of the second part 6 are clamped in a locked state of the bayonet-closure between the area adjoining the edge of the passage opening 22 and the at least one spring 23 and are secured against unwanted rotation.

Figure 11:
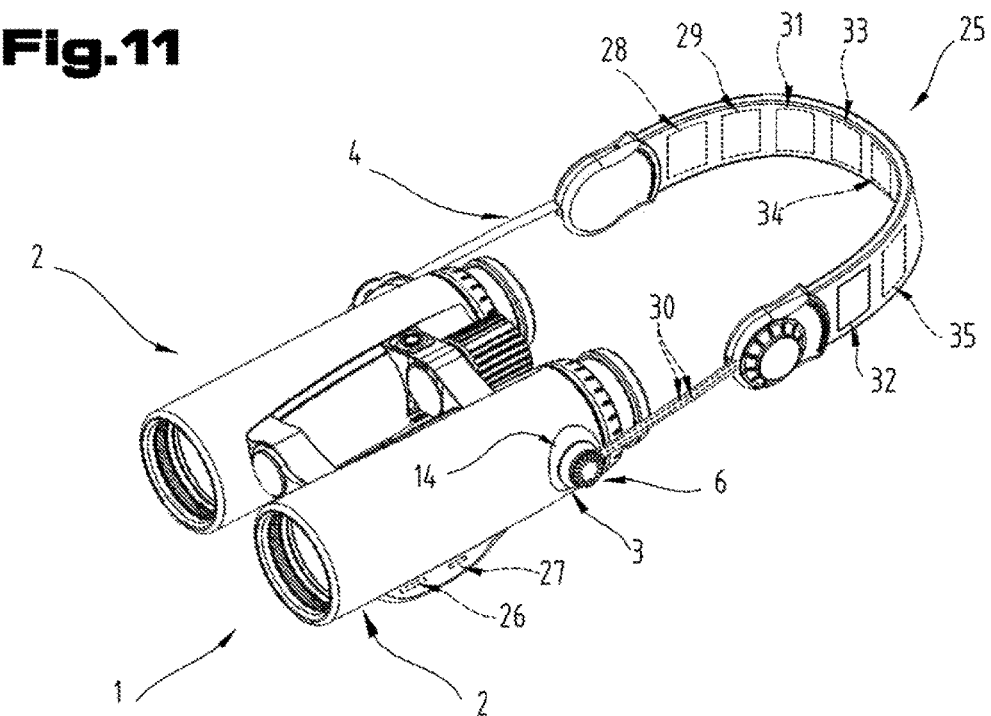

FIG. 11 shows a pair of binoculars as an example embodiment of the long-range optical device 1, which is connected to the strap 4. The strap 4 functions as a support means or support strap, both ends of which are secured to the mount housings 14 on one of the two housings 2 of the binoculars. Without restricting its universality the strap 4 according to this example embodiment has a neck strap 25 as a middle part, which is worn slung around the neck of a user to leave the arms free between periods of looking through the binoculars.

Even though only one strap is mentioned in the following, other support means are also possible. For example such support means can also be in the form of a rucksack or an article of clothing, such as a jacket. In particular, functional jackets or waistcoats, as commonly worn by the hunting community, can be equipped with suitable strap or cord-like extensions provided with mount housings 14.

According to the invention the system consisting of the binoculars and the strap 4 also comprises electrical or electronic components. Thus for example in the binoculars a laser range finder 26 can be provided with a control unit 27 provided therefor. Furthermore, a power supply unit 28 is integrated into the strap 4 or into the neck strap 25 of the strap 4. According to the invention, the electrical or the electronic components of the binoculars on the one hand and the strap 4 or the neck strap 25 on the other hand are connected and at least one of the mounts 3 also has interfaces for connecting between said electrical or electronic components.

For example, in the example embodiment shown in FIG. 11, the laser range finder 26 and the control unit 27 are supplied with the power necessary for operation by the power supply 28. Alternatively or in addition to the control unit 27 provided in the binoculars a control unit or a control 29 can also be provided in the strap 4 or in the neck strap 25. In this way it is possible to evaluate the data received by the laser range finder 26 to determine the value of the distance of a remote object in the control 29 in the neck strap 25. In addition to lines 30 for powering the various electricity consumers separate lines can also be used for data transmission and lines 30 can also be used for the power supply.

Of course, the power supply and the data transmission can also be performed via the same lines.

For the user to control the operating states an input 31 or an input terminal is provided on the neck strap 25. The input 31 can be in the form of a keypad for example. The provision of a display 32 is also advantageous. The functions of the input 31 and the display 32 can also be combined in a touch screen.

According to one development of this example embodiment a GPS-receiver 33 can also be arranged in the strap 4 or the neck strap 25. It is also advantageous if sensors 34 are provided for example for measuring the environmental air pressure or the environmental temperature. Providing an antenna 35 then also enables the transmission of data to external devices. Advantageously, the antenna 35 is designed for close-range communication by means of technologies such as Bluetooth, WLAN or RFID.

In addition to or instead of the antenna 35 a terminal can also be provided for line-connected electrical connection by means of plugs or sockets, such as for example USB plugs, cinch plug connectors or the like. In this way it is also possible that the long-range optical device or the housing 2 of the binoculars is or are connected via the interface in the mount 3 to external electronic components.

In a further embodiment variant for example a microphone can also be provided (not shown) for inputting speech or for inputting control commands to a control 29 with speech recognition. A microphone can also be used to record notes in a data memory whilst looking through the binoculars. In the design with a loudspeaker a user can be provided with information, e.g. about the operating status of the long-range optical device 1. By providing a microphone and a loudspeaker it is possible to record animal voices or birdsong for example and make a comparison with corresponding prerecorded noises.

Together with the GPS receiver 33 an acceleration sensor and a compass make it possible to determine the absolute spatial position. According to one development a vibration motor can also be provided for producing haptic feedback. It is also advantageous to arrange solar cells on the strap 4 to charge the power supply unit 28.

Figure 1:
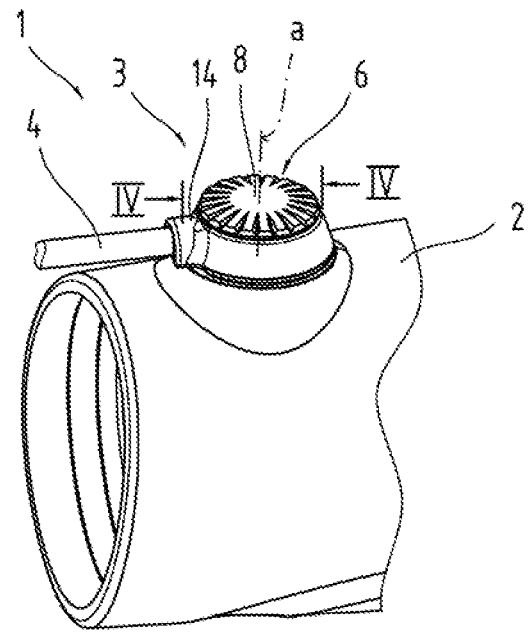
Figure 2:
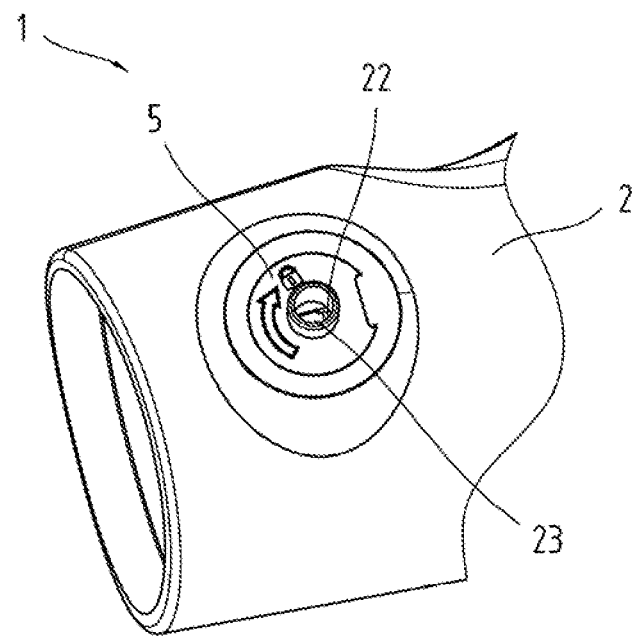

As explained above, the connection is formed between the binoculars or between the long-range optical device 1 on the one hand and the strap 4 on the other hand with the mount 3, which is designed essentially as a cylindrical pin bearing. The mount housing 14 with its passage opening 18 forms a hole bearing which by using the second part 6 (FIG. 3) is fixed onto the first part 5 of the housing 2 of the long-range optical device 1 (FIG. 2). In addition to this mechanical connection between the long-range optical device 1 and the strap 4 the mount 3 according to the invention is also used to form an electrical or electronic connection between the long-range optical device 1 and the strap 4.

Figure 12:
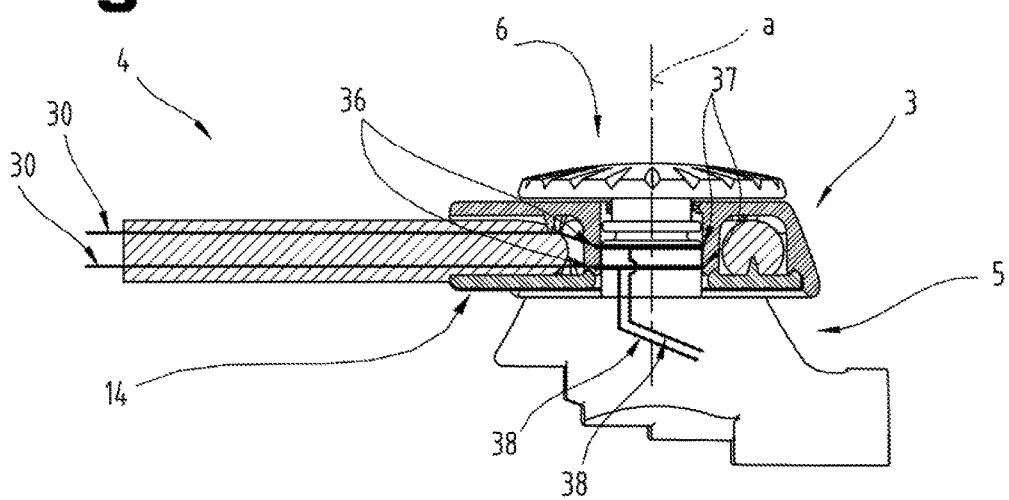

FIG. 12 shows a cross-section of one of the two mounts 3 according to FIG. 11. The lines 30 running on the inside of the strap 4 are guided into the section of the passage opening 18 of the mount housing 14 and end respectively in an electricity consumer 36. Furthermore, the socket 24 of the first part 5 of the housing 2 of the long-range optical device 1 comprises respectively a slip ring 37. The slip rings 37 are arranged offset to one another in axial direction on an outer cylinder casing surface of the socket 24. In this case they are arranged such that they are in contact respectively with one of the electricity consumers 36 of the mount housing 14. Lastly, electrical lines run from the slip rings 37 to electrical components of the binoculars or the long-range optical device 1. This design of the mount 3 has the advantage that the mount housing 14 of the strap 4 can be rotated as required relative to the first part 5 of the housing 2 of the binoculars without the electrical connection being broken. Furthermore, it is also the case that the electrical interface or the mount 3 is designed to be watertight and dustproof. This can be achieved for example by having a suitable shaping of the flange 13 on the second part 6 and the passage opening 18 of the mount housing 14.

Figure 13:
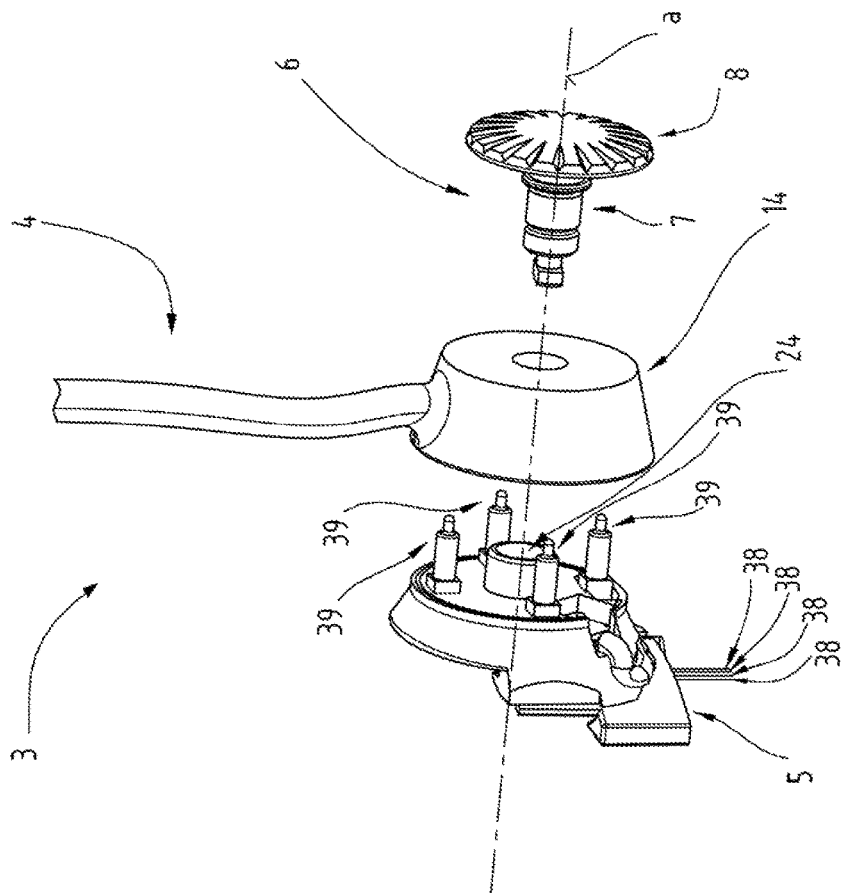

FIG. 13, 14 show a further and possibly independent embodiment of the mount 3 for connecting the binoculars and the strap 4, wherein the same reference numerals and component names have been used for the same parts as in the preceding FIGS. 1 to 12. To avoid unnecessary repetition reference is made to the detailed description in the preceding sections.

Figure 14:
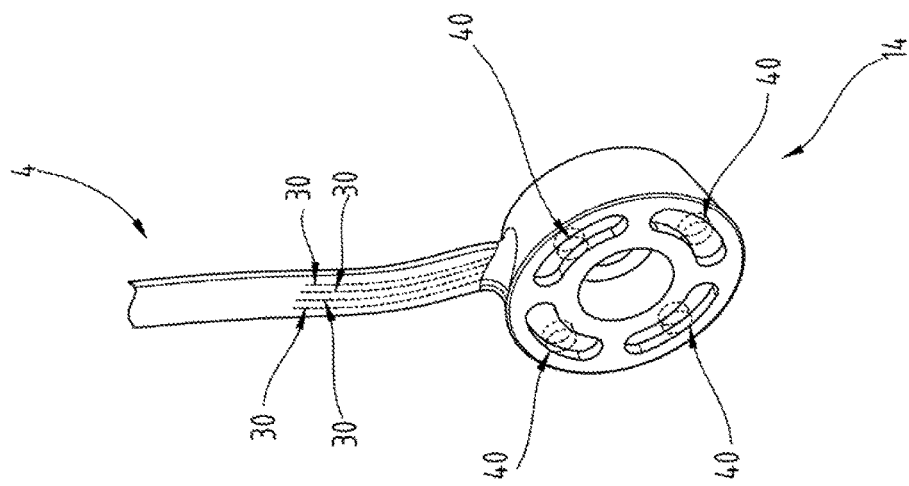

FIGS. 13 and 14 show a further example embodiment of the mount 3 for connecting the binoculars and the strap 4. FIG. 13 shows the mount 3 in an exploded view. In the mount 3 according to this example embodiment an electric or electronic interface is formed for four lines 30, 38 respectively. In addition, facing circular ring disc-like sides of the mount housing 14 on the one hand and of the first part 5 of the binoculars on the other hand have corresponding contact points. On the first part 5 four contact pins 39 are arranged for this which are aligned to be parallel to the axis a. The contact pins 39 are offset relative to one another by 90° and have the same radial distance from the axis a. According to the arrangement of the contact pins 39 on the first part 5 of the binoculars the mount housing 14 has four curved contact slots 40 respectively. The curved design of the contact slots 40 enables the pivoting of the mount housing 14 by slightly less than 90° about the axis a. In the assembled state of the mount 3 the contact pins 39 can be moved in the contact slots 40 about a corresponding angle.

According to an alternative variant (not shown) of this example embodiment one of the contact pins 39 and its corresponding contact slot 40 are arranged at a radial distance from the axis a, which is different from the radial distance of the other contact pins 39 and contact slots 40. In this way the incorrect polarity of the electrical contacts is prevented when connecting the mount 3.

Lastly, in a further variant it is also possible that instead of the contact slots 40 contact sockets are formed in the mount housing 14 (shown as holes in FIG. 14 by dashed lines). In this structural form of the mount 3 the mount housing 14 is thus fixed in its relative position on the first part 5 of the housing 2 of the binoculars, i.e. is not rotatable in the assembled state.

Figure 15:
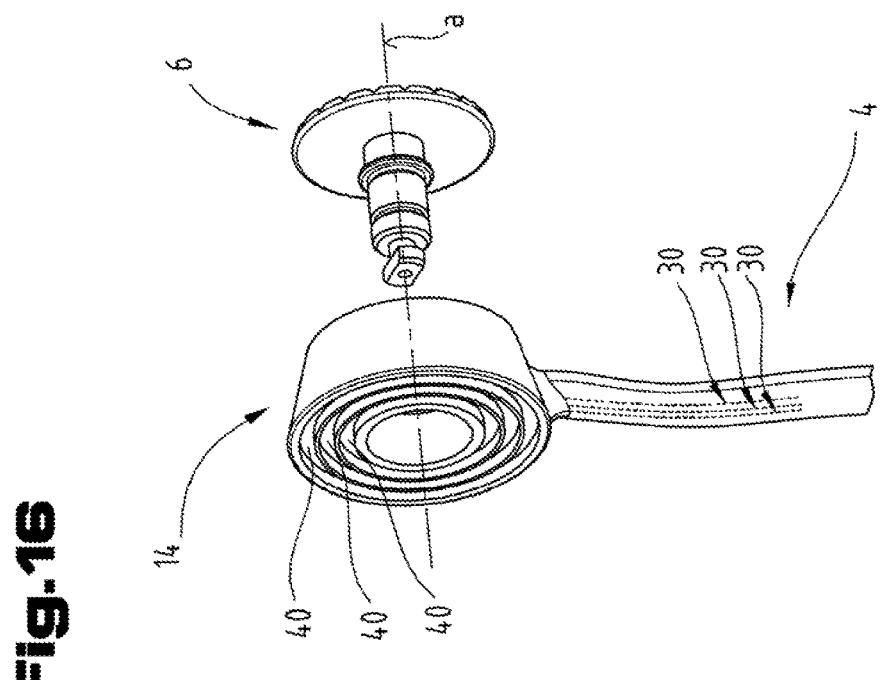
Figure 16:
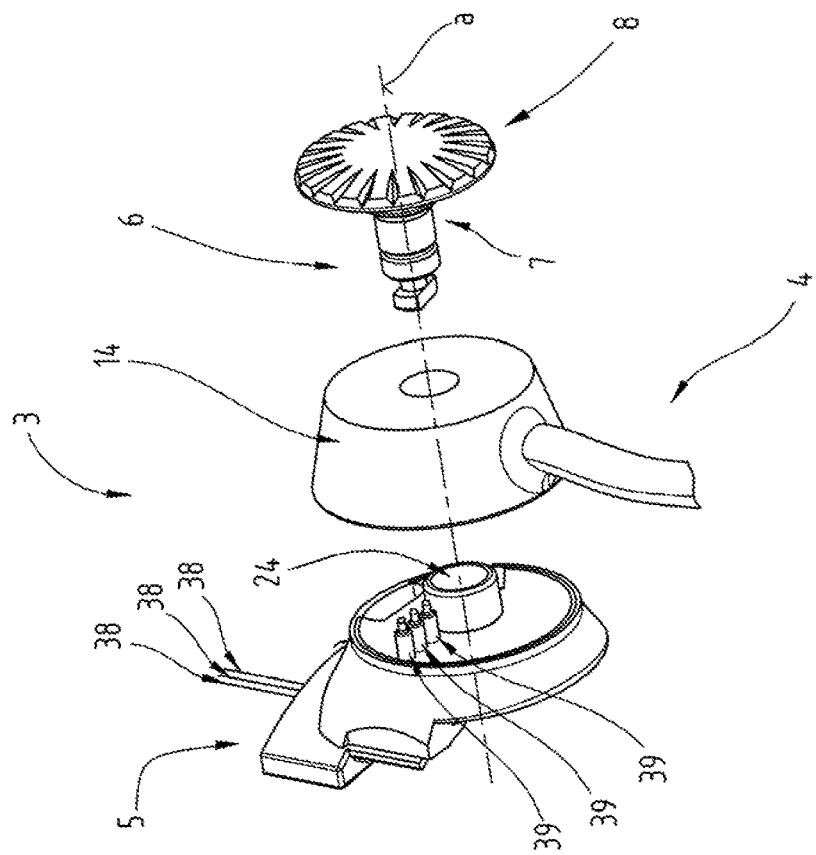

FIGS. 15 and 16 show a further alternative example embodiment of the mount 3 for connecting the long-range optical device 1 and the strap 4. The corresponding parts are shown again in an exploded view respectively. The contact points for electrical contact between binoculars on the one hand and the strap 4 on the other hand are arranged on opposite sides of the first part 5 of the long-range optical device 1 and the mount housing 14 of the strap 4. According to this example embodiment on the first part 5 of the housing 2 three contact pins 39 aligned parallel to the axis a are arranged to be offset relative to one another in radial direction. Accordingly, in the mount housing 14 of the strap 4 on the corresponding opposite side three annular contact slots 40 are formed each receiving one of the contact pins 39 respectively. Thus on connecting the mount housing 14 to the first part 5 of the housing 2 of the binoculars at the same time electrical contact can be established between the contact pins 39 and the contact slots 40. This configuration of electrical contacts has the advantage of free rotatability of the mount housing 14 about the axis a relative to the first part 5 of the long-range optical device 1.

According to the invention embodiments are also possible with two, three or more than four contact points (each with a contact pin 39 and a contact slot 40).

In the example embodiments according to FIGS. 15 and 16 and FIGS. 13 and 14 the respective contact points are arranged on opposite circular ring disc shaped sides of the mount housing 14 one the one hand and the first part 5 of the housing 2 of the binoculars one the other hand or are formed in said sides. In an alternative variant the contact pins 39 can also be arranged on the mount housing 14 and the contact slots 40 can be arranged on the first part 5 of the housing 2 of the binoculars.

FIGS. 17 and 18 show a further example embodiment of the mount 3 between the strap 4 and the binoculars, again in an exploded view. In this case a wireless power or signal transmission unit is integrated into the mount 3. For this purpose the mount housing 14 of the strap 4 comprises a first induction loop 41 and the first part 5 of the housing 2 of the binoculars a second induction loop 42. The induction loops 41, 42 are arranged or formed respectively in the opposite circular ring disc-shaped sides of the mount housing 14 one the one hand and the first part 5 of the housing 2 one the other hand. The induction loops 41, 42 are thus arranged to be essentially flat.

Figure 19:
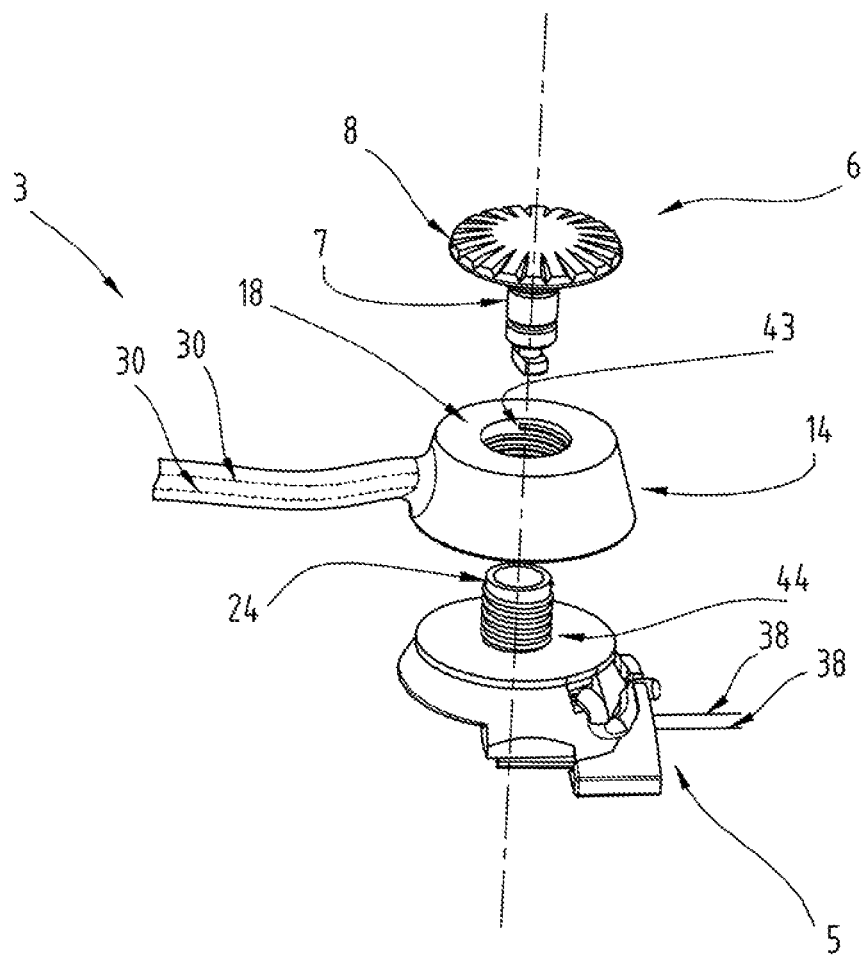

FIG. 19 shows a further example embodiment of the mount 3 for connecting the strap 4 and the binoculars to a wireless interface for power or data transmission. According to this example embodiment an outer coil 43 is arranged in the passage opening 18 of the mount housing 14. Furthermore, the socket 24 of the first part 5 of the housing 2 of the binoculars is designed with an inner coil 44. In the connected state the inner coil 44 bears on the inside of the outer coil 43 of the mount housing 14, wherein the inner coil 44 and the outer coil 43 are arranged coaxially to one another. Lastly, it is generally an advantage if the shaft 7 of the second part 6 is made from a ferromagnetic material, as in this way the shaft 7 also functions as an iron core and in this way the power or signal transmission can be improved.

The provision of a wireless power or signal transmission, as described in the example embodiments according to FIGS. 17 to 19, also has the advantage of increased functional safety. Because of the electrical insulation of the induction loops 41, 42 or coils 43, 44 the interface is less prone to interference from penetrating moisture or dirt.

As an alternative to the described example embodiments of an inductive coupling for power or signal transmission also a capacitive coupling could be used. Interfaces using infrared radiation or fiber optic cables would also be possible for transmitting signals.

The scope of protection is defined by the claims. The description and the drawings however are used for interpreting the claims. Individual features or combinations of features of the various different shown and described example embodiments can represent in themselves independent solutions according to the invention. The problem addressed by the inventive solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure some elements have not been represented true to scale and/or have been enlarged and/or reduced in size.

| List of reference numerals | |
|---|---|
| 1 | long-range optical device |
| 2 | housing |
| 3 | mount |
| 4 | strap |
| 5 | first part |
| 6 | second part |
| 7 | shaft |
| 8 | head |
| 9 | holding nose |
| 10 | holding nose |
| 11 | section |
| 12 | area |
| 13 | flange |
| 14 | mount housing |
| 15 | half shell |
| 16 | half shell |
| 17 | projection |
| 18 | passage opening |
| 19 | web |
| 20 | mount housing |
| 21 | eyelet |
| 22 | passage opening |
| 23 | spring |
| 24 | socket |
| 25 | neck strap |
| 26 | laser range finder |
| 27 | control unit |
| 28 | power supply |
| 29 | control |
| 30 | lines |
| 31 | input |
| 32 | display |
| 33 | GPS receiver |
| 34 | sensor |
| 35 | antenna |
| 36 | electricity consumer |
| 37 | slip ring |
| 38 | line |
| 39 | contact pin |
| 40 | contact slot |
| 41 | induction loop |
| 42 | induction loop |
| 43 | coil |
| 44 | coil |

The invention claimed is:

1. A binoculars, comprising a housing and support means, wherein between the housing and the support means at least one mount is formed for mechanical connection, wherein the at least one mount comprises an interface for electrical or electronic connection between the housing and the support means.

2. The binoculars as in claim 1, wherein electrical or electronic components are arranged in the housing and in the support means.

3. The binoculars as in claim 1, wherein the support means is connected to a mount housing of the mount and the mount housing is connected releasably to the housing.

4. The binoculars as in claim 1, wherein the support means is secured rotatably or pivotably on the housing.

5. The binoculars as in claim 3, wherein the at least one mount comprises a first part with a socket arranged on the housing, wherein the mount housing is mounted at least pivotably about an axis of the socket.

6. The binoculars as in claim 1, wherein the interface to the electrical or electronic connection is formed by contact points and in the connected state by contact pins connected electrically to said contact points.

7. The binoculars as in claim 3, wherein the interfaces for electrical or electronic connection are formed by contact points, which are arranged eft on opposite, circular ring disc-shaped sides, of the mount housing and the first part of the housing.

8. The binoculars as in claim 7, wherein the contact points are formed by circular arc-shaped contact openings, and contact pins projecting into the contact openings.

9. The binoculars as in claim 5, wherein the interfaces to the electrical or electronic connection are formed by slip rings on an outer casing surface of the socket and by electricity consumers in a passage opening of the mount housing.

10. The binoculars as in claim 5, wherein the interfaces to the electrical or electronic connection are formed by induction loops, which are arranged on opposite circular ring-shaped sides of the mount housing and the first part of the housing.

11. The binoculars as in claim 5, wherein the interfaces to the electrical or electronic connection are formed by coils, which are arranged on an outer casing surface of the socket and in a passage opening of the mount housing and coaxially to one another.

12. The binoculars as in claim 1, wherein a power supply unit is arranged in the support means.

13. The binoculars as in claim 1, wherein in the support means an electronic component is arranged which is selected from a group comprising a control, an input, a display, a GPS receiver, a temperature sensor, an air pressure sensor, a microphone, a loudspeaker, a data memory, an acceleration sensor, a compass, a vibration motor, solar cells, an antenna and a terminal for the wired electrical connection.

14. The binoculars as in claim 1, wherein a laser range finder or camera is arranged in the housing.

15. The binoculars as in claim 5, wherein the axis of the socket is aligned to be normal to a surface of the housing.

16. The binoculars as in claim 5, wherein the at least one mount has at least one second part connected releasably to the at least one first part, wherein the at least one first part and the at least one second part form a bayonet-closure.

17. The binoculars as in claim 16, wherein the at least one second part has a shaft and a head projecting over the shaft in radial direction.

18. The binoculars as in claim 17, wherein the at least one second part has at least one holding nose arranged on the shaft and protruding from the latter in radial direction.

19. The binoculars as in claim 18, wherein the at least one second part has at least two opposite holding noses.

20. The binoculars as in claim 19, wherein the at least two holding noses are designed in one piece with one another and are formed by a beam-like element arranged on an end side of the shaft.

21. The binoculars as in claim 17, wherein in a section arranged immediately in front of the at least one holding nose the shaft has a smaller diameter than in an area immediately adjoining said section as viewed in the direction of the head.

22. The binoculars as in claim 17, wherein the shaft has a flange protruding in a radial direction, the flange being arranged in an area between the at least one holding nose and the head, and the flange forms a collar running in circumferential direction of the shaft.

23. The binoculars as in claim 17, wherein the shaft is mounted in a passage opening of the mount housing, wherein in an area of the passage opening at least one web is arranged which projects into the passage opening and is made from an elastomer material, wherein a diameter of the shaft is greater in the region of the flange than an internal cross-section of the passage opening in the region of the at least one web.

24. The binoculars as in claim 1, wherein the mount housing is formed by at least two half-shells, wherein the support means is clamped between the two half-shells.

25. The binoculars as in claim 18, wherein the at least one first part of the mount has a passage opening in the form of an elongated hole for the at least one holding nose of the at least one second part, wherein a width of the passage opening is smaller than a diameter of a projection of the holding nose and the shaft in a plane normal to a longitudinal central straight line of the shaft.

26. The binoculars as in claim 25, wherein the at least one first par, as viewed in an insertion direction of the shaft through the passage opening, has at least one spring, arranged after the passage opening, wherein the at least one holding nose of the at least one second part is clamped in a locked state of the bayonet-closure between a section adjoining an edge of the passage opening and the at least one spring.

27. The binoculars as in claim 26, wherein at least one spring comprises a leaf spring.

\* \* \* \* \*